US009286301B2

(12) United States Patent
Motoyama

(10) Patent No.: US 9,286,301 B2
(45) Date of Patent: Mar. 15, 2016

(54) APPROACH FOR MANAGING ACCESS TO ELECTRONIC DOCUMENTS ON NETWORK DEVICES USING DOCUMENT ANALYSIS, DOCUMENT RETENTION POLICIES AND DOCUMENT SECURITY POLICIES

(71) Applicant: Tetsuro Motoyama, Los Altos, CA (US)

(72) Inventor: Tetsuro Motoyama, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 14/194,341

(22) Filed: Feb. 28, 2014

(65) Prior Publication Data

US 2015/0248419 A1  Sep. 3, 2015

(51) Int. Cl.
| | |
|---|---|
| G06F 17/00 | (2006.01) |
| G06F 7/04 | (2006.01) |
| H04L 29/06 | (2006.01) |
| H04L 9/32 | (2006.01) |
| G06F 17/30 | (2006.01) |
| G06F 21/62 | (2013.01) |

(52) U.S. Cl.
CPC .... *G06F 17/30085* (2013.01); *G06F 17/30011* (2013.01); *G06F 17/30598* (2013.01); *G06F 21/6218* (2013.01); *G06F 2221/2113* (2013.01); *H04L 63/08* (2013.01); *H04L 63/105* (2013.01); *H04L 63/20* (2013.01)

(58) Field of Classification Search
CPC ....... H04L 63/20; H04L 63/105; H04L 63/08; G06F 21/6218; G06F 2221/2113
USPC ..................... 726/1, 4, 26; 713/165, 166, 168
See application file for complete search history.

(56) References Cited

U.S. PATENT DOCUMENTS

| | | | |
|---|---|---|---|
| 2007/0097420 A1 | 5/2007 | Shah | |
| 2008/0144068 A1 | 6/2008 | Digby | |
| 2010/0332428 A1* | 12/2010 | McHenry et al. | ............... 706/12 |
| 2011/0137908 A1 | 6/2011 | Dom | |
| 2013/0339362 A1 | 12/2013 | Yang | |
| 2014/0280335 A1* | 9/2014 | Bilange et al. | ................ 707/771 |
| 2014/0337345 A1 | 11/2014 | Motoyama et al. | |

OTHER PUBLICATIONS

U.S. Appl. No. 13/890,812, filed May 9, 2013, Office Action, mailing date Oct. 22, 2015.

* cited by examiner

*Primary Examiner* — Aravind Moorthy
(74) *Attorney, Agent, or Firm* — Hickman Palermo Becker Bingham LLP; Edward A. Becker

(57) ABSTRACT

An approach for managing access to electronic documents uses document retention and document security policies. In response to a request to access a particular electronic document, a document retention policy and a document security policy are applied to the particular electronic document. Deletion and/or access to the electronic document are managed based upon the document retention policy and the document security policy. A content analyzer automatically analyzes the content of electronic documents and determines one or more classifications that apply to the electronic documents. The content analyzer may be configured to use one or more of semantic analysis, text analysis, video analysis, voice analysis or image analysis to analyze electronic documents. A policy verifier is configured to check one or more classifications manually assigned to electronic documents by users against one or more classifications automatically determined for the electronic documents by the content analyzer and allow mismatches to be corrected.

15 Claims, 18 Drawing Sheets

DOCUMENT RETENTION POLICY DATA

| DOCUMENT RETENTION CLASSIFICATION | DELETION CRITERIA | DOCUMENT TYPES | CLASSIFICATION DESCRIPTION |
|---|---|---|---|
| P0 | NONE | O | PUBLISHED TO OUTSIDE |
| L1 | 5 YEARS | O | MEETING RECORDS |
| L2 | 7 YEARS | O | ACCOUNTING RECORDS |
| C1 | 5 YEARS | O & P | GENERAL DOCUMENTS |
| C2 | 3 YEARS | O | GENERAL MEETING RECORDS |
| C3 | 1 YEAR | O | TEMPORARY DOCUMENTS |
| C4 | END OF PROJECT | O | PROJECT "A" DATA |

DOCUMENT SECURITY POLICY DATA

400

| DOCUMENT SECURITY CLASSIFICATION | DESCRIPTION | ACCESS POLICY |
|---|---|---|
| U | UNCLASSIFIED | ANYONE |
| R1 | SECURITY LEVEL 1 | COMPANY |
| R2 | SECURITY LEVEL 2 | COMPANY GROUP |
| R3 | SECURITY LEVEL 3 | MANAGER AND ABOVE |
| R4 | SECURITY LEVEL 4 | DIRECTOR AND ABOVE |
| R5 | SECURITY LEVEL 5 | COMPANY OFFICERS ONLY |
| S | SPECIFIED PERSONS | LIST OF SPECIFIED PEOPLE (DEFAULT: CREATOR ONLY) |

FILE INFORMATION TABLE

| DOCUMENT NAME | CREATION DATE | LOCATION | RETENTION CLASSIFICATION | SECURITY CLASSIFICATION |
|---|---|---|---|---|
| F1 | XX/YY/ZZ | L | L2 | R2 |
| F2 | XX/YY/ZZ | L | C2 | R1 |
| F3 | XX/YY/ZZ | L | C4 | R5 |
| F4 | XX/YY/ZZ | R | C3 | U |
| F5 | XX/YY/ZZ | L | P0 | U |
| C3 | XX/YY/ZZ | R | L1 | S |
| C4 | XX/YY/ZZ | O | L1 | R3 |

┌──────────────────────────────────────────────────┐ ─1002
              │ CALL RETENTION POLICY HANDLER TO OBTAIN DOCUMENT │
              │                  RETENTION CLASSIFICATION        │
              └──────────────────────────────────────────────────┘
                                     ↓                            ─1004
              ┌──────────────────────────────────────────────────┐
              │ CALL SECURITY POLICY HANDLER TO OBTAIN DOCUMENT  │
              │                   SECURITY CLASSIFICATION        │
              └──────────────────────────────────────────────────┘
                                     ↓                            ─1006
              ┌──────────────────────────────────────────────────┐
              │ CALL LOGIN/NETWORKDEVICE/DATE HANDLER TO OBTAIN  │
              │     CREATOR, NETWORK DEVICE AND CURRENT DATE     │
              └──────────────────────────────────────────────────┘
                                     ↓                            ─1008
              ┌──────────────────────────────────────────────────┐
              │ CALL ENCRYPTION ENGINE TO ENCRYPT APPLICATION    │
              │                      PROGRAM DATA                │
              └──────────────────────────────────────────────────┘
                                     ↓                            ─1010
              ┌──────────────────────────────────────────────────┐
              │        CALL PACKAGER TO CREATE DATA PACKAGE      │
              └──────────────────────────────────────────────────┘
```

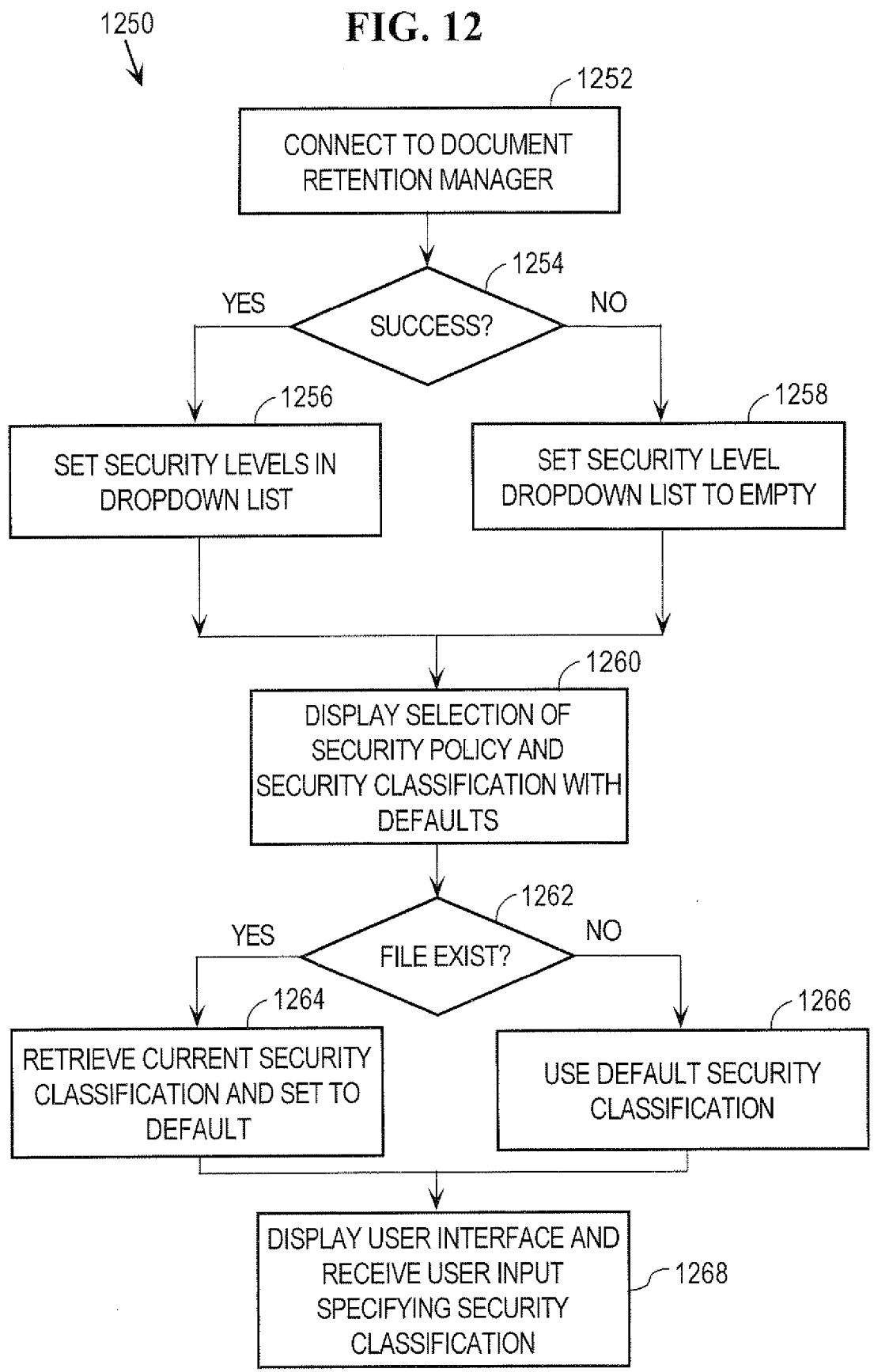

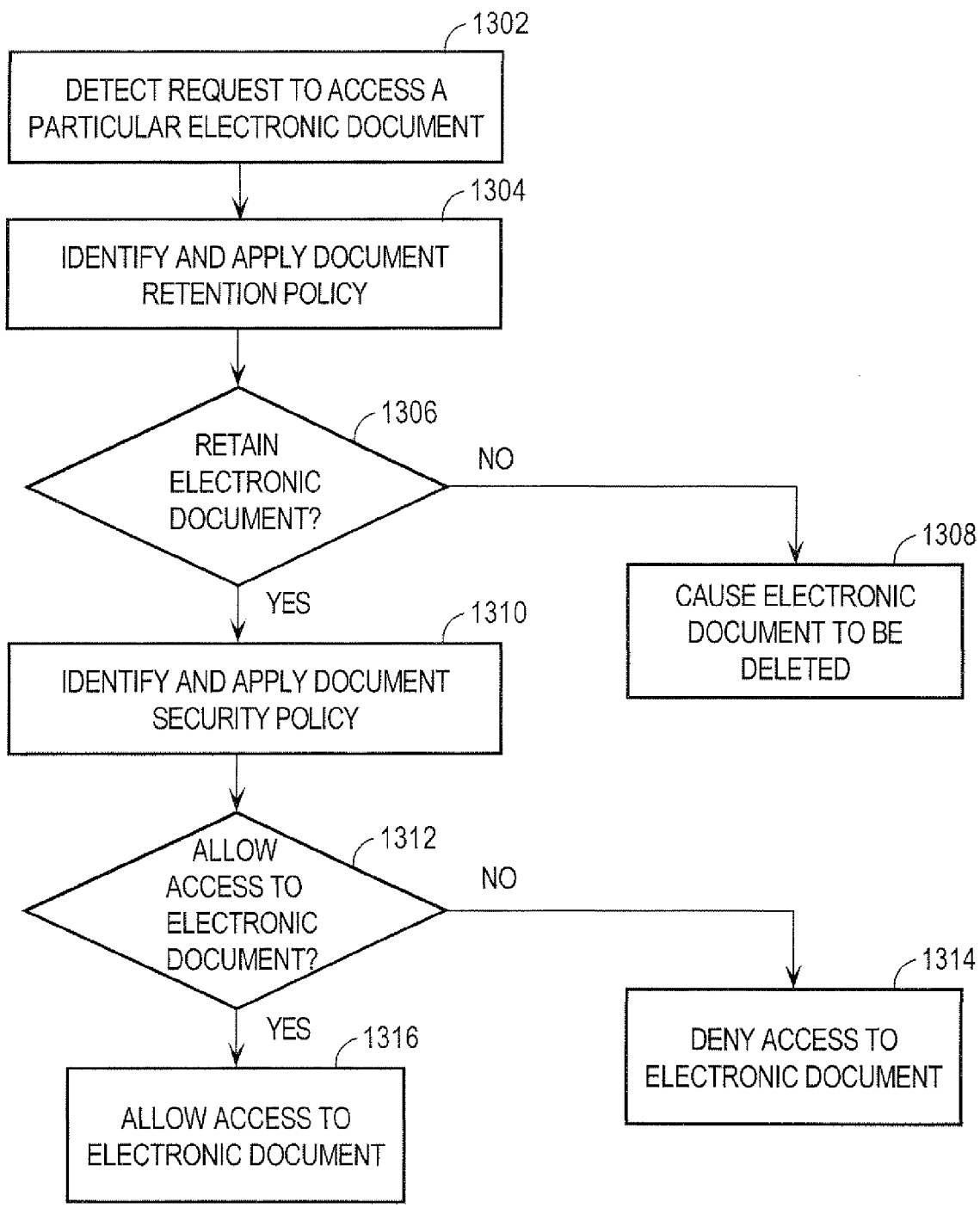

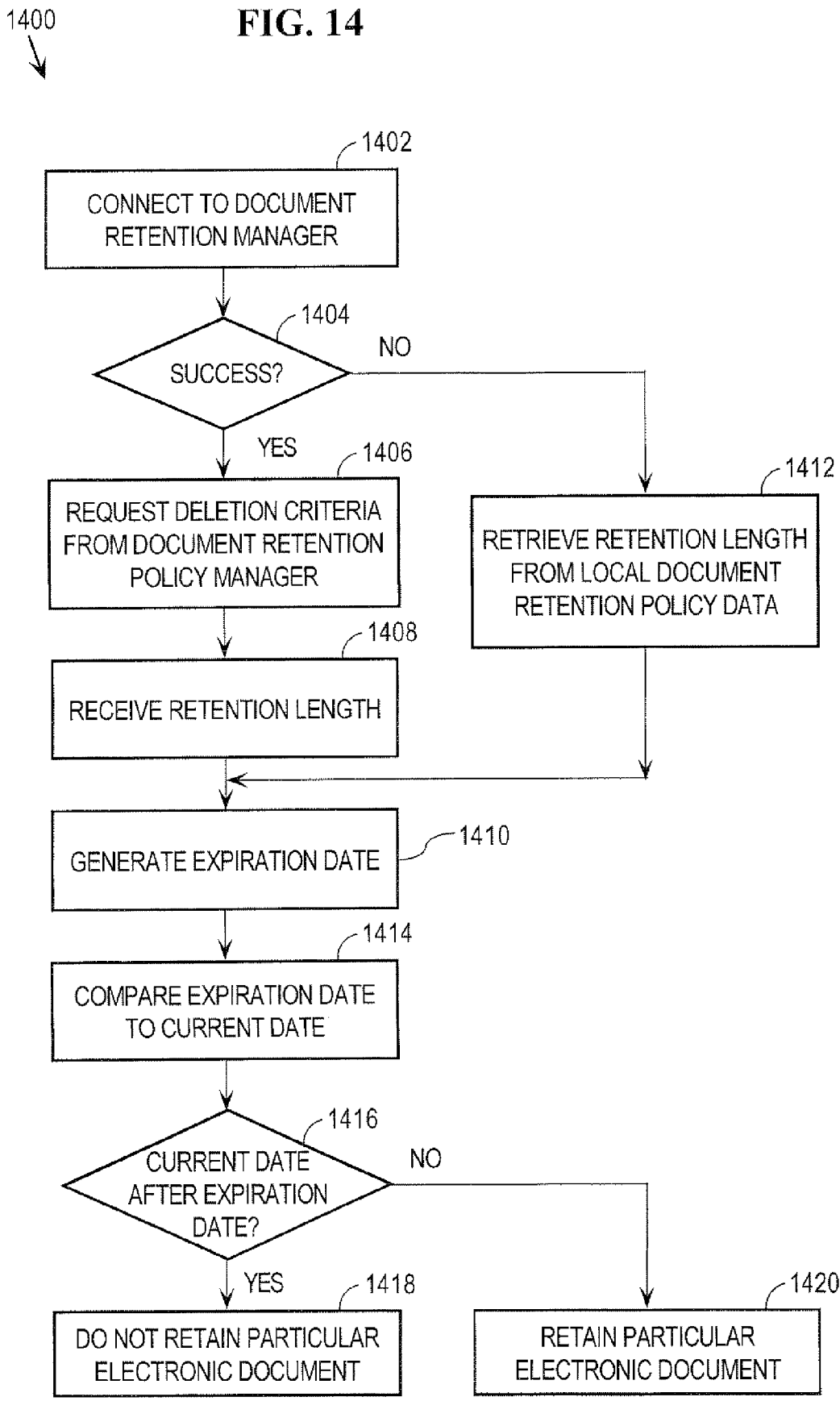

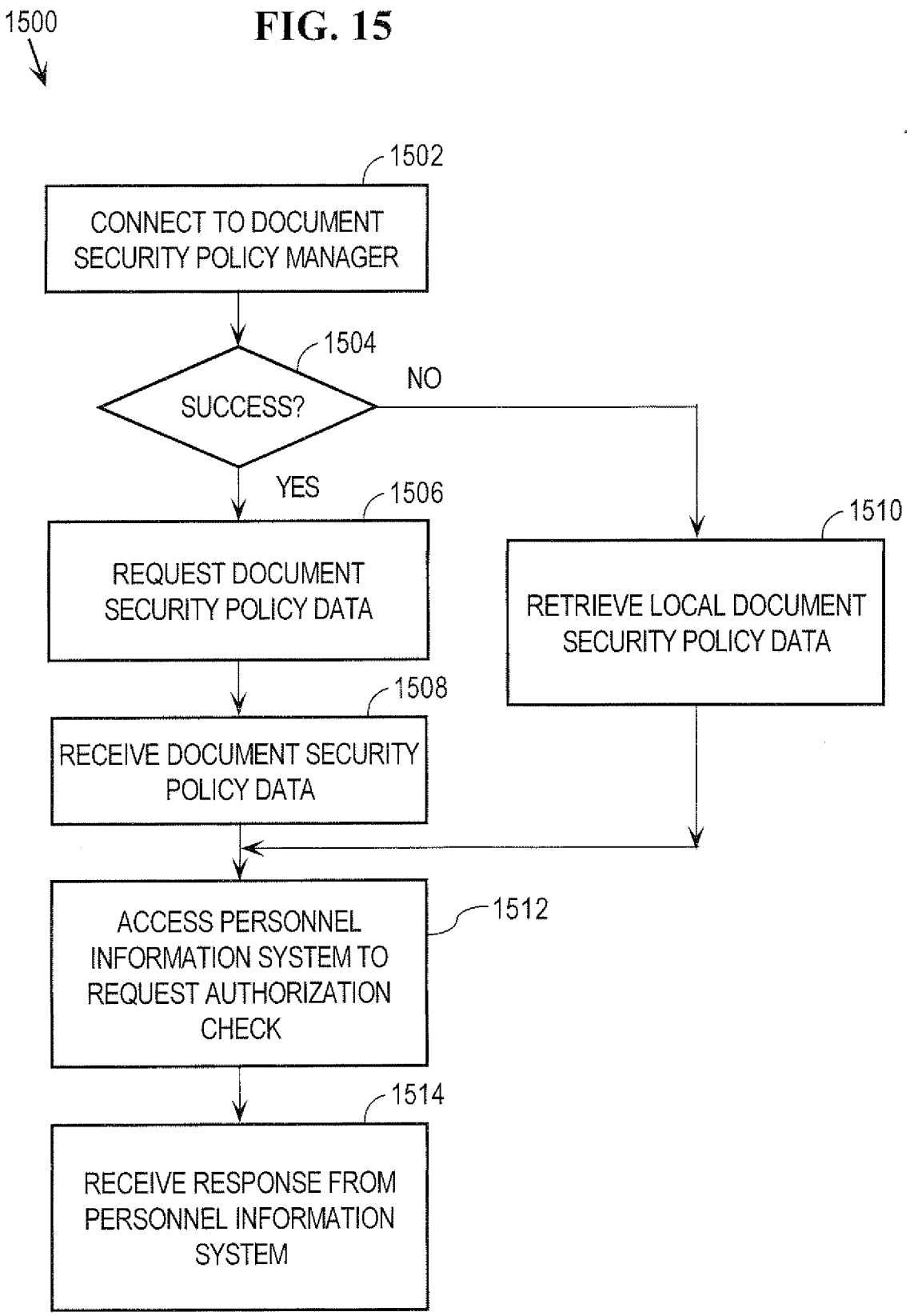

FIG. 16A

POLICY DATA TABLE

1600

| Authorization Level | Policy Inside Building/Company | Policy Outside Building/Company |
|---|---|---|
| Authorization Level 1 | None | Level 0 |
| Authorization Level 2 | Level 0 | Level 0, Level 1 |
| Authorization Level 3 | Level 0, Level 1 | Level 0, Level 1, Level 2 |
| . . . | . . . | . . . |
| Lowest Authorization Level | All Confidential Information | All Confidential Information |

FIG. 16B

POLICY DATA TABLE

1650

| Authorization Level | Policy Inside Building/Company | Policy Outside Building/Company |
|---|---|---|
| Project A | Projects A, B, C, D | Project A |
| Group E | Groups E, G, X | Group E |
| User 1 | Projects A, D | Project A |
| User 2 | Groups E, X | Group E |

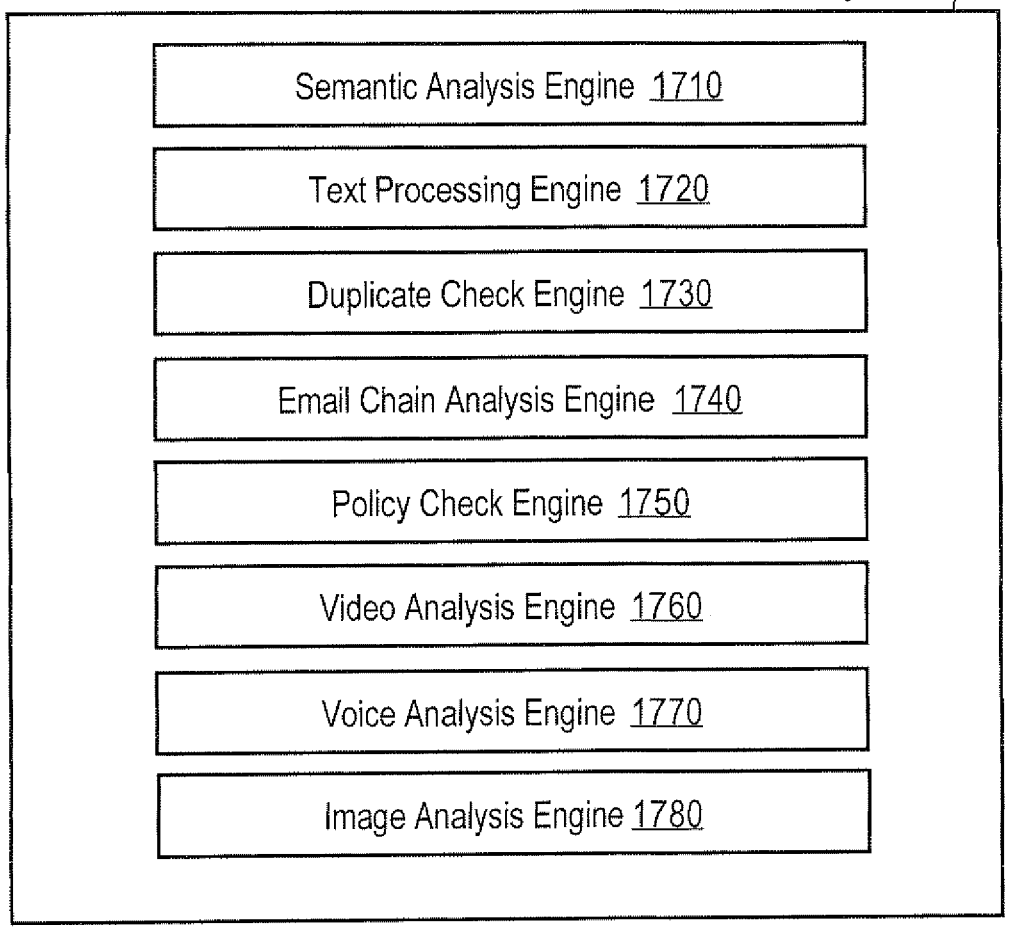

APPROACH FOR MANAGING ACCESS TO ELECTRONIC DOCUMENTS ON NETWORK DEVICES USING DOCUMENT ANALYSIS, DOCUMENT RETENTION POLICIES AND DOCUMENT SECURITY POLICIES

RELATED APPLICATIONS

This application is related to U.S. patent application Ser. No. 11/034,483, filed on Jan. 5, 2005, entitled "Approach For Deleting Electronic Documents On Network Devices Using Document Retention Policies" and U.S. patent application Ser. No. 11/182,870, entitled "Approach for Deleting Electronic Documents on Network Devices Using Document Retention Policies," filed on Jul. 14, 2005, issued as U.S. Pat. No. 7,703,125 on Apr. 20, 2010, and U.S. patent application Ser. No. 13/890,812, entitled "System For Processing Data Received From Various Data Sources," filed on May 9, 2013 the contents all of which are hereby incorporated by reference in their entirety for all purposes.

FIELD OF THE INVENTION

This invention relates generally to electronic document management, and more specifically, to an approach for applying content analysis in document management to enforce policies and prepare for electronic discovery.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Conventional approaches for managing electronic documents rely upon human classification that may result in errors, for example, from errors in classification or data entry errors. In addition, large volumes of older documents are often times never classified. Producing electronic documents, for example in response to a court order, is complicated by incomplete classification and/or errors made during human classification and can result in increased costs and time invested by businesses.

SUMMARY

An approach is provided for managing access to electronic documents using document retention policies and document security policies. A plurality of electronic documents is received. Content of one or more electronic documents from the plurality of electronic documents is analyzed and content data is generated that indicates results of analyzing the content of the one or more electronic documents. A document classification for each electronic document from the one or more electronic documents is automatically determined based upon the content data that indicates results of analyzing the content of the one or more electronic documents. Document classification data for the one or more electronic documents that indicates a user-specified document classification for each electronic document from the one or more electronic documents is retrieved. A determination is made whether a document classification automatically determined for a particular electronic document from the one or more electronic documents is the same as a particular user-specified document classification for the particular electronic document indicated by the document classification data. In response to determining that the document classification automatically determined for the particular electronic document from the one or more electronic documents is not the same as the particular user-specified document classification for the particular electronic document indicated by the document classification data, then a graphical user interface is generated that allows a user to specify a correct document classification for the particular electronic document from the one or more electronic documents. In response to determining that the document classification automatically determined for the particular electronic document from the one or more electronic documents is the same as the particular user-specified document classification for the particular electronic document indicated by the document classification data, then a determination is made, based upon the document classification automatically determined for the particular electronic document from the one or more electronic documents and one or more policies that correspond to the document classification, whether the particular electronic document should be deleted. In response to determining, based upon the document classification automatically determined for the particular electronic document from the one or more electronic documents and one or more policies that correspond to the document classification, that the particular electronic document should be deleted, then causing the particular electronic document to be deleted.

BRIEF DESCRIPTION OF THE DRAWINGS

In the figures of the accompanying drawings like reference numerals refer to similar elements.

FIG. 7 depicts contents of an example file information table that is used to manage access to electronic documents using document retention policies and document security policies.

FIG. 10 is a flow diagram that depicts an example approach for a file handler to create self-extracting and executable data.

FIG. 12 is a flow diagram that depicts an example approach for editing document security policy data for a particular electronic document.

FIG. 13 is a flow diagram that depicts an approach for managing access to electronic documents using document retention policies and document security policies.

FIG. 14 is a flow diagram that depicts a document manager obtaining deletion criteria from a document retention policy manager.

FIG. 15 is a flow diagram that depicts an approach for applying a document security policy to an electronic document.

FIGS. 16A and 16B are tables that depict access rights data.

FIG. 17 is a block diagram depicting example elements of content analyzer.

DETAILED DESCRIPTION

Figure 1:
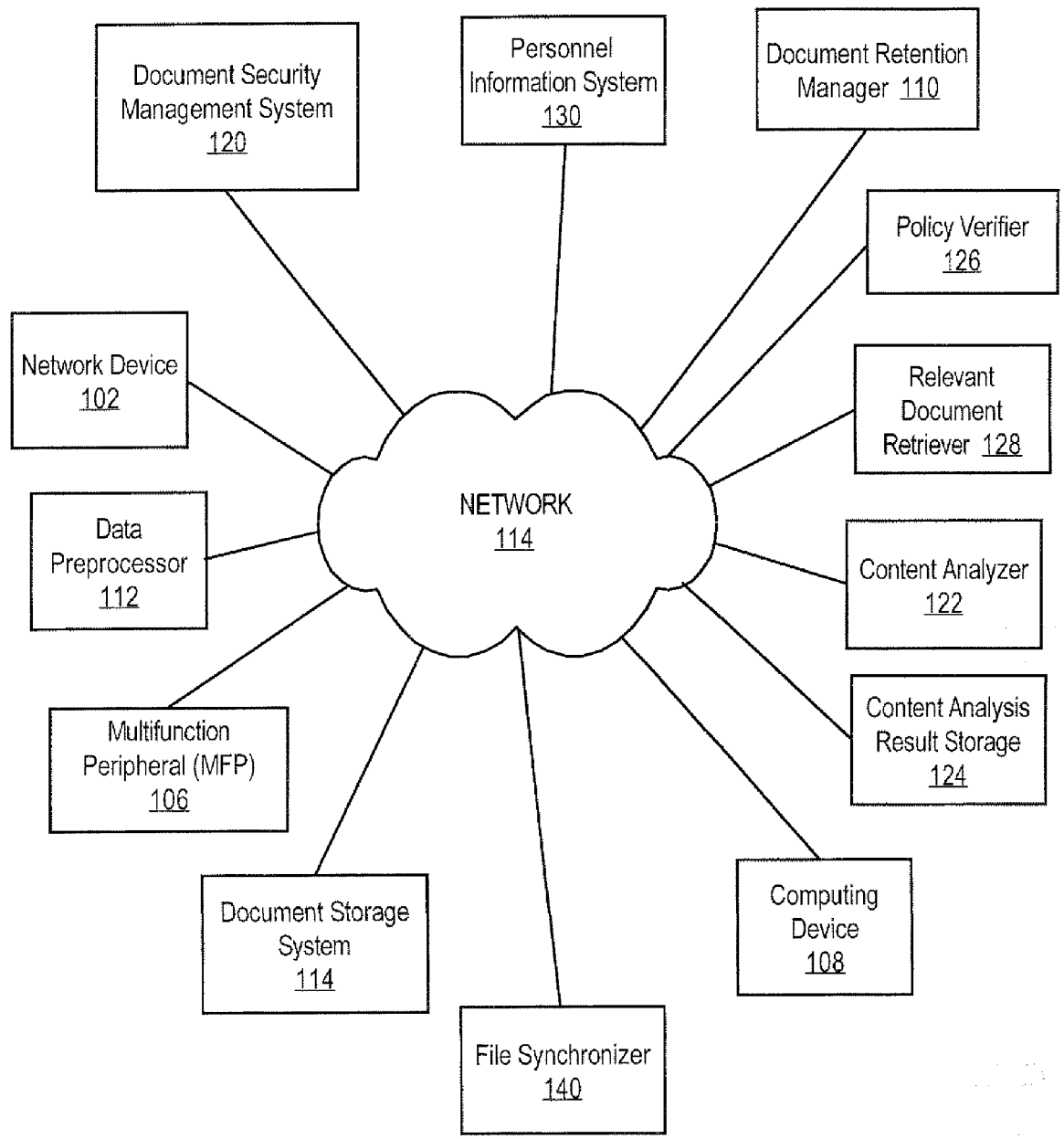
FIG. 1 is a block diagram that depicts an arrangement for managing electronic documents.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

I. OVERVIEW
II. ELECTRONIC DOCUMENT MANAGEMENT ARCHITECTURE
III. DOCUMENT RETENTION POLICIES
IV. CREATING, MAINTAINING AND DISTRIBUTING DOCUMENT RETENTION POLICIES
V. DOCUMENT SECURITY POLICIES
VI. CREATING, MAINTAINING AND DISTRIBUTING DOCUMENT SECURITY POLICIES
VII. MANAGING ACCESS TO ELECTRONIC DOCUMENTS USING DOCUMENT RETENTION POLICIES AND DOCUMENT SECURITY POLICIES
VIII. SELF EXTRACTING AND EXECUTABLE DATA IMPLEMENTATIONS
IX. EDITING DOCUMENT RETENTION POLICIES
X. EDITING DOCUMENT SECURITY POLICIES
XI. IMPLEMENTATION MECHANISMS

I. Overview

An approach is provided for managing access to electronic documents using document retention policies and document security policies. The document retention policies specify a plurality of document retention classifications and one or more deletion criteria for documents belonging to each document retention classifications from the plurality of document retention classifications. For example, the document retention policy may specify that documents belonging to a particular document retention classification are to be deleted after a specified time, at a specified time or in response to the occurrence of a particular event. The document retention policies are defined by document retention policy data that is managed by a document retention policy manager. The document retention policy manager disseminates the document retention policy data to one or more network devices over a communications network. The document security policies specify a plurality of document security classifications and one or more access criteria for each document security classification from the plurality of document security classifications. The document security policies are defined by document security policy data that is managed by a document security management system. The document security management system disseminates the document security policy data to the one or more network devices over the communications network.

In response to detecting a request to access a particular electronic document stored on a network device, a document retention policy and a document security policy are applied to the particular electronic document. If, based upon application of the document retention policy to the particular electronic document, a determination is made that the particular electronic document is to be deleted, then the particular electronic document is deleted from the network device. If, based upon application of the document security policy to the particular electronic document, a determination is made that access to the particular electronic document should be denied, then access to the particular electronic document is denied. Embodiments also include the document retention policy manager initiating retention policy audits, the use of automatic or manual loading or auto-destruction code to handle deleting electronic documents from removable media, as well as the use of self-extracting and executable data to automatically enforce document retention and document security policies. Embodiments also include the use of a content analyzer that is configured to automatically analyze the content of electronic documents and determine one or more classifications that apply to the electronic documents. The content analyzer may be configured to use one or more of semantic analysis, text analysis, video analysis, voice analysis or image analysis to analyze electronic documents. A policy verifier is configured to check one or more classifications manually assigned to electronic documents by users against one or more classifications automatically determined for the electronic documents by the content analyzer. When mismatches are detected, a graphical user interface is provided to allow users to correct the mismatches.

II. Electronic Document Management Architecture

FIG. 1 depicts an example arrangement 100 for managing electronic documents. As used herein, the term "electronic document" and "document" refer to any type of digital information. Examples of digital information include, without limitation, email, text data in any format, computer-generated content, multimedia data, video data, voice data, or image data. Arrangement 100 includes a network device 102, a data preprocessor 112, a multifunction peripheral (MFP) 106, a document storage system 114, a file synchronizer 140, a computing device 108, a content analysis result storage 124, a content analyzer 122, a relevant document retriever 128, a policy verifier 126, a document retention manager 110, a personnel information system 130 and a document security management system 120 communicatively coupled via a network 114.

Network device 102 may be implemented by any type of network device. Examples of network device 102 include, without limitation, wired or wireless devices such as personal digital assistants (PDAs), portable or laptop computers and other network devices. Document storage system 114 may be implemented by any mechanism for storing electronic documents. Examples of document storage system 114 include, without limitation, a database management system and a file system. MFP 106 may be implemented by any device that performs one or more functions, such as printing, copying, facsimile or scanning. Document retention manager 110 is a system for managing document retention policy data. Personnel information system 130 is a system for storing personnel information. Document security management system 120 is a system for storing security policy data.

Network 114 may be implemented by any mechanism or medium that provides for the exchange of information between the elements depicted in FIG. 1. Examples of network 114 include, without limitation, a network such as a Local Area Network (LAN), Wide Area Network (WAN), Ethernet or the Internet, or one or more terrestrial, satellite or wireless links. Although the various elements are depicted in FIG. 1 as being external to network 114, any of these elements may be implemented within network 114, depending upon the requirements of a particular implementation. The various elements depicted in FIG. 1 are described in more detail hereinafter.

A user uses a computing device 108 to generate documents or information with a classification according to the policy. The generated documents may be stored at computing device 108 or at a document storage system 114. If the documents are stored at personal computer 108, an installed agent on personal computer 108 may periodically upload the newly-created documents to document storage system 114. Documents may also be saved on document storage system 114 via a File Synchronizer 140 a hard drive or other storage device on computing device 108 is used as a Google Drive or a Dropbox service. Alternatively, computing device 108 may be a Chrome book-type device where all the data are stored in document storage system 114.

Document storage system 114 may maintain multiple versions of documents and archive or delete documents based upon one or more retention policies, for example, in conjunction with Document Retention Manager 110. MFP 106 is a device with one or more functional capabilities, such as printing, scanning, etc., and may be used by a user of computing device 108, for example, to print documents. When documents are saved, the document retention manager 110 and/or the document security management system 120 may be accessed to generate the saved object. In addition, both systems have capability to audit computing devices, such as network device 102, computing device 108, etc., to enforce one or more data retention polices, for example, as described in U.S. patent application Ser. No. 11/034,483, the contents of which are incorporated herein for all purposes. One or more security policies may also be enforced using the document security management system 120.

Document security management system 120, either alone or in combination with Personnel Information System 130, manages access to documents using access right working along with. Example access rights are depicted in FIGS. 16A and 16B. Document Retention Manager 110 manages the retention of documents based upon document retention policies. Policy Verifier 126 is alerted when documents saved with particular information supplied by the document creator conflicts with results of the content analyzer 122. For example, a user may specify for a particular document, a particular document classification that is inconsistent with a document classification determined by content analyzer 122. Human intervention via personal computer 108 may be used to resolve the conflict. For example, a user may manually change or correct a document classification for the particular document to resolve the conflict. This may be useful in situations where a user makes a mistake when manually designating a classification for an electronic document or when the user makes a mistake in determining which classification is to be assigned to an electronic document. For example, when manually assigning a classification to an electronic document a user may make a typographical error or simply select an incorrect classification. As another example, when the user manually evaluates an electronic document to determine a classification that should be assigned to an electronic document, the user may not consider all of the information considered by content analyzer 122, e.g., for a large electronic document. Also, content analyzer 122 may provide a more suitable classification designation for an electronic document by using sophisticated tools, such as semantic analysis, text analysis, video analysis, voice analysis and image analysis, as described in more detail hereinafter. Policy verifier 126 may provide a graphical user interface that allows a user to correct/change one or more classifications assigned to an electronic document. Alternatively, policy verifier 126 may operate with one or more other elements of FIG. 1 to provide the graphical user interface to allow a user to correct/change one or more classifications assigned to an electronic document.

Relevant document retriever 128 may be configured to use natural language processing and information available from content analysis results storage 124 to retrieve relevant documents from document storage system 114. Relevant document retriever 128 may be configured with a Web-based user interface to allow a user to construct and submit natural language queries. Relevant document retrieval 128 may also be configured to operate with Personnel Information System 130 and document security management system 120 to verify the access right of users using the system. Access rights may be given to individuals or groups of individuals and may be granted for specific purposes. For example, during the e-discovery phase of a legal proceeding, specified personnel, such as attorneys and legal department personnel, may be granted access to documents.

Figure 18:
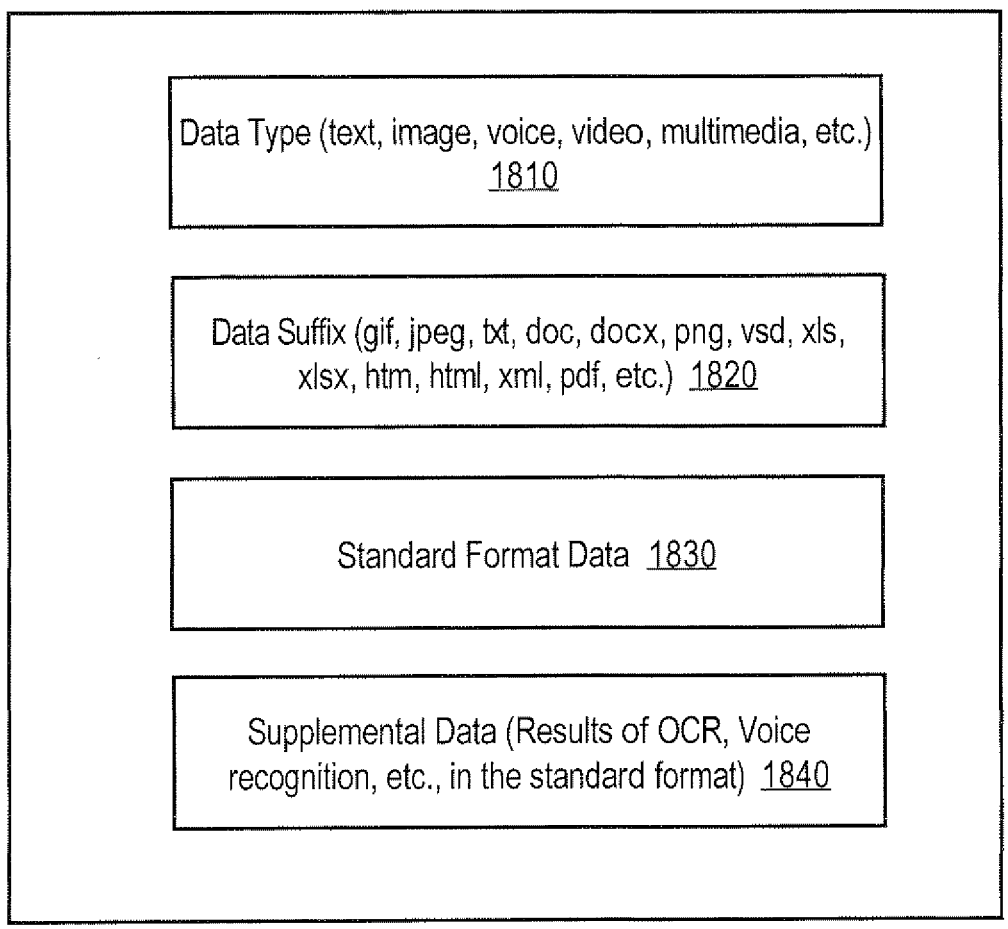
FIG. 18 is a table that depicts example results of processing performed by a data preprocessor.

Content analyzer 122 analyzes the content of documents and generates content analysis results that are stored in Content Analysis Result Storage 124 to assist the retrieval and enforcement of policies. This may include automatically determining one or more document classifications that apply to an electronic document. Before analyzing the contents of the documents, however, content analyzer 122 may invoke data preprocessor 112 to convert documents into specified file formats, for example, standard formats for text, image, multimedia, voice, etc. This process is described in U.S. patent application Ser. No. 13/890,812. Data preprocessor 112 analyzes documents to determine their content types before converting to the standard formats. In addition, data preprocessor 112 may perform various recognition tasks such as OCR and voice recognition. FIG. 18 depicts a table 1800 that includes example results of processing performed by data preprocessor 112. The data in table 1800 includes a data type, a data suffix (to preserve the original file type), a reference to original data, standard format data and supplemental data. The result of the data preprocessor 112 is shown in FIG. 18 as a data structure.

III. Document Retention Policies

Figures 2, 3:
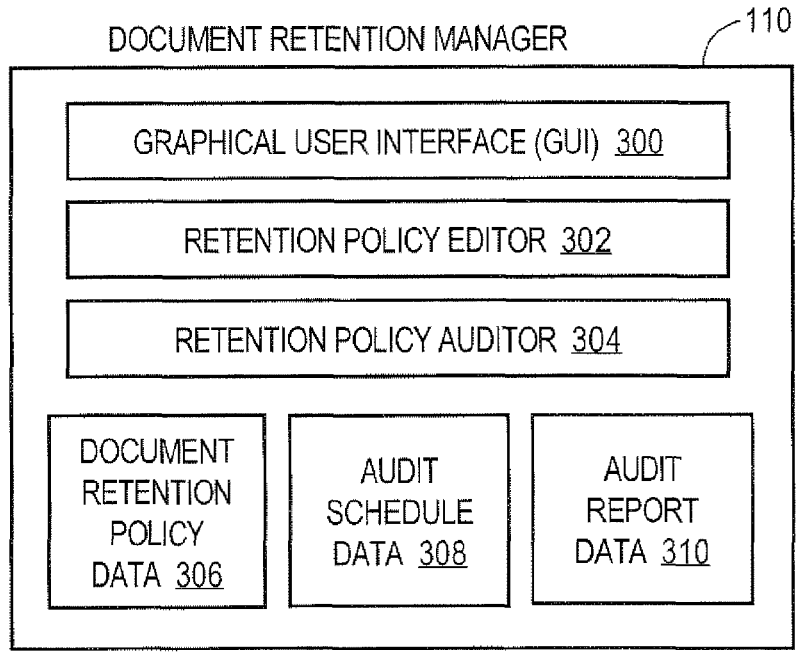
FIG. 2 is a table that depicts example document retention policy data that defines one or more document retention policies.
FIG. 3 depicts an example implementation of a document retention policy manager.

According to one embodiment of the invention, a document retention policy specifies one or more deletion criteria for a plurality of electronic document retention classifications. FIG. 2 depicts a table 200 that stores example document retention policy data. FIG. 2 is a table 200 that depicts example document retention policy data that defines one or more document retention policies. FIG. 2 depicts the document retention policy data organized in tabular format for explanation purposes only and the document retention policy data may be stored in any type of data structure or format, depending upon the requirements of a particular implementation. Furthermore, document retention policy data is not limited to the example data depicted in table 200 and may include fewer data types or more data types than depicted in FIG. 2, depending upon the requirements of a particular implementation.

In the example depicted in FIG. 2, table 200 includes a document retention classification column, a deletion criteria column, a document type column ("O"=official; "P"=private)

and a classification description column. Each row of table 200 specifies a retention policy for a particular document retention classification. For example, the document retention classification L1 pertains to meeting records and has a document retention policy that specifies that documents in this classification are to be deleted after five years. In this example, the "L" in the document retention classification "L1" refers to a legal requirement where the length of retention is specified by law. As another example, the document retention classification C4 pertains to project "A" data and has a document retention policy that specifies that electronic documents in this document retention classification are to be deleted after the project has been completed. In this example, the "C" in the document retention classification "C4" refers to a corporate standard.

Any number and types of document retention classifications and deletion criteria may be used, depending upon the requirements of a particular implementation, and the invention is not limited to any particular number or types of document retention classifications or deletion criteria. For example, as described above, the deletion criteria may specify a time duration that may be applied on a document-by-document basis, based upon the creation date or storage date of the electronic documents. As another example, the deletion criteria may specify a date certain at which all constituent electronic documents of an electronic document retention classification are to be deleted. As another example, the deletion criteria may specify that all electronic documents associated with an electronic document retention classification are to be deleted in response to the occurrence of an event. Example events include a notification from administrative personnel and the completion of a project, as described above.

IV. Creating, Maintaining and Distributing Document Retention Policies

According to one embodiment, document retention manger 110 provides for the creation and management of document retention policies that are defined by document retention policy data. FIG. 3 depicts an example implementation of document retention manger 110. In this example, document retention manger 110 is configured with a graphical user interface (GUI) 300, a retention policy editor 302 and a retention policy auditor 304. Document retention manger 110 also includes document retention policy data 306, audit schedule data 308 and audit report data 310. Document retention policy data 306 is described in this section, while audit schedule data 308 and audit report data 310 are described in later sections.

Retention policy editor 302 is configured to allow users to create, store and manage document retention policies via GUI 300. For example, retention policy editor 302 allows users to create document retention policy data 306, such as the document retention policy data contained in table 200, through the use of various editing controls. This may include, for example, allowing a user to edit "raw" document retention policy data 306 or display one or more templates on GUI 300 and allow the user to enter data into available fields. Alternatively, a user may retrieve existing document retention policy data 306 from document security management system 120 and a storage medium. Users may then edit the document retention policy data retrieved from the document security management system 120 and store the edited data in the document retention policy data 306. Users may also use the editing controls provided by retention policy editor 302 to delete document retention policy data 306. Document retention policy data 306 may be stored in a volatile memory, such as a random access memory (RAM), and/or stored on a non-volatile memory such as one or more disks, optical media or tape.

According to one embodiment of the invention, document retention manger 110 is configured to distribute document retention policy data 306 to network device 102, document storage system 104 and MFP 106. An MFP is a multi function machine that has capability of a scanner, a printer and/or a copier. Many MFPs can store the documents that are scanned, copied or printed. Therefore, the stored documents should follow the document retention policy and document security policy. Document retention manger 110 may be configured to automatically provide document retention policy data 306 to those elements that require the data. For example, document retention manger 110 may be configured to provide document retention policy data 306 to network devices based upon schedule data contained in audit schedule data 308. Document retention manger 110 may be configured to query network device 102 to determine whether network device 102 requires document retention policy data 306. Alternatively, network device 102 may request document retention policy data 306 from document retention manger 110. Furthermore, retention policy auditor 304 may be configured to provide document retention policy data 306 to network device 102 in response to document retention policy data 306 being updated. For example, suppose that a user updates document retention policy data 306 using retention policy editor 302. An administrator may determine that document retention policy data 306 needs to be updated to reflect a change in a document retention policy. According to one embodiment of the invention, retention policy auditor 304 is configured to automatically detect that document retention policy data 306 has been updated and provide the updated document retention policy data 306 to network device 102. Audit report data 310 may include data that indicates details about the providing of document retention policy data 306 to network devices, such as network device 102. For example, audit report data 310 may indicate that a particular version of document retention policy data 306 was provided to network device 102. Audit report data 310 may also include data that indicates the results of a document retention policy audit conducted at one or more network devices, either alone or in conjunction with the application of document security policies to electronic documents in response to access requests, as described in more detail hereinafter.

V. Document Security Policies

Figures 4, 5:
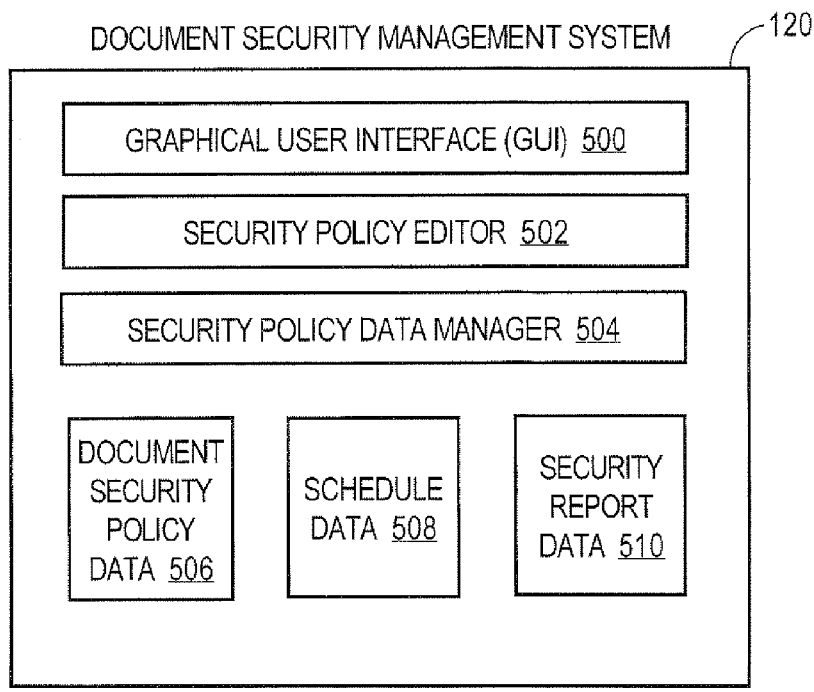
FIG. 4 is a table that depicts example document security policy data that defines one or more document security policies.
FIG. 5 depicts an example implementation of a document security policy manager.

According to one embodiment of the invention, a document security policy specifies one or more access criteria for a plurality of electronic document retention classifications. FIG. 4 is a table 400 that depicts example document security policy data that defines one or more document security policies. FIG. 4 depicts the document security policy data organized in tabular format for explanation purposes only and the document security policy data may be stored in any type of data structure or format, depending upon the requirements of a particular implementation. Furthermore, document security policy data is not limited to the example data depicted in table 400 and may include fewer data types or more data types than depicted in FIG. 4, depending upon the requirements of a particular implementation.

In the example depicted in FIG. 4, table 400 includes a document security classification column, a description column and an access policy column. Each row of table 400 corresponds to a document security classification and specifies a description and access policy for each document security classification. For example, the document security classification U pertains to unclassified documents that any user is permitted to access. As another example, the document security classification R1 pertains to a company. Users attempting to access documents having the R1 document security classification must be members of a specified company. The document security classification R2 pertains to a company group, meaning that a user attempting to access documents having the R2 document security classification must be members of a specified company group. As another example, document security classification R5 pertains to company officers only. This means that users attempting to access electronic documents having the R5 document security classification must be company officers. The document security classification "S" specifies a list of people who are authorized to access the electronic document. The names may be uniquely specified for a particular business organization. For example, the names may be the names used by the email system of a business organization.

Any number and types of document security classifications and access policies may be used, depending upon the requirements of a particular implementation, and the invention is not limited to any particular number or types of document security classifications or access policies.

VI. Creating, Maintaining and Distributing Document Security Policies

According to one embodiment of the invention, document security management system 120 provides for the creation and management of document retention policies that are defined by document retention policy data. FIG. 5 depicts an example implementation of document security management system 120. In this example, document security management system 120 is configured with a graphical user interface (GUI) 500, a security policy editor 502 and a security policy data manager 504. Document security management system 120 also includes document security policy data 506, schedule data 508 and security report data 510.

Security policy editor 502 is configured to allow users to create, store and manage document security policies via GUI 500. For example, security policy editor 502 allows users having the proper credentials to create document security policy data 506, such as the document security policy data contained in table 400, through the use of various editing controls. This may include, for example, allowing a user to edit "raw" document security policy data 506 or display one or more templates on GUI 500 and allow the user to enter data into available fields. Alternatively, an authorized user may retrieve existing document security policy data 506 from document security management system 120. Users may then edit and store the document security policy data 506. Authorized users may also use the editing controls provided by security policy editor 502 to delete document security policy data 506. Document security policy data 506 may be stored in a volatile memory, such as a random access memory (RAM), and/or stored on a non-volatile memory such as one or more disks, optical media or tape.

According to one embodiment of the invention, security policy data manager 504 is configured to distribute document security policy data 506 to secure network device 102. Security policy data manager 504 may be configured to automatically provide document security policy data 506 to those elements that require the data. For example, security policy data manager 504 may be configured to provide document security policy data 506 to network devices based upon schedule data contained in schedule data 508. Security policy data manager 504 may be configured to query secure network device 102 to determine whether network device 102 requires document security policy data 506. Alternatively, network device 102 may request document security policy data 506 from security policy data manager 504. Furthermore, security policy data manager 504 may be configured to provide document security policy data 506 to secure network device 102 in response to document security policy data 506 being updated. For example, suppose that a user updates document security policy data 506 using security policy editor 502. An administrator may determine that document security policy data 506 needs to be updated to reflect a change in a document security policy. According to one embodiment of the invention, security policy data manager 504 is configured to automatically detect that document security policy data 506 has been updated and provide the updated document security policy data 506 to network device 102. Security report data 510 may include data that indicates details about the providing of document security policy data 506 to network devices, such as network device 102. For example, security report data 510 may indicate that a particular version of document security policy data 506 was provided to network device 102. Security report data 510 may also include data that indicates the results of a network device applying document security policies to electronic documents in response to access requests, as described in more detail hereinafter.

VII. Managing Access to Electronic Documents Using Document Retention Policies and Document Security Policies According to one embodiment of the invention, in response to detecting a request to access a particular electronic document stored on a network device, a document retention policy and a document security policy are applied to the particular electronic document. If, based upon application of the document retention policy to the particular electronic document, a determination is made that the particular electronic document is to be deleted, then the particular electronic document is deleted from the network device. If, based upon application of the document security policy to the particular electronic document, a determination is made that access to the particular electronic document should be denied, then access to the particular electronic document is denied.

Figure 6A:
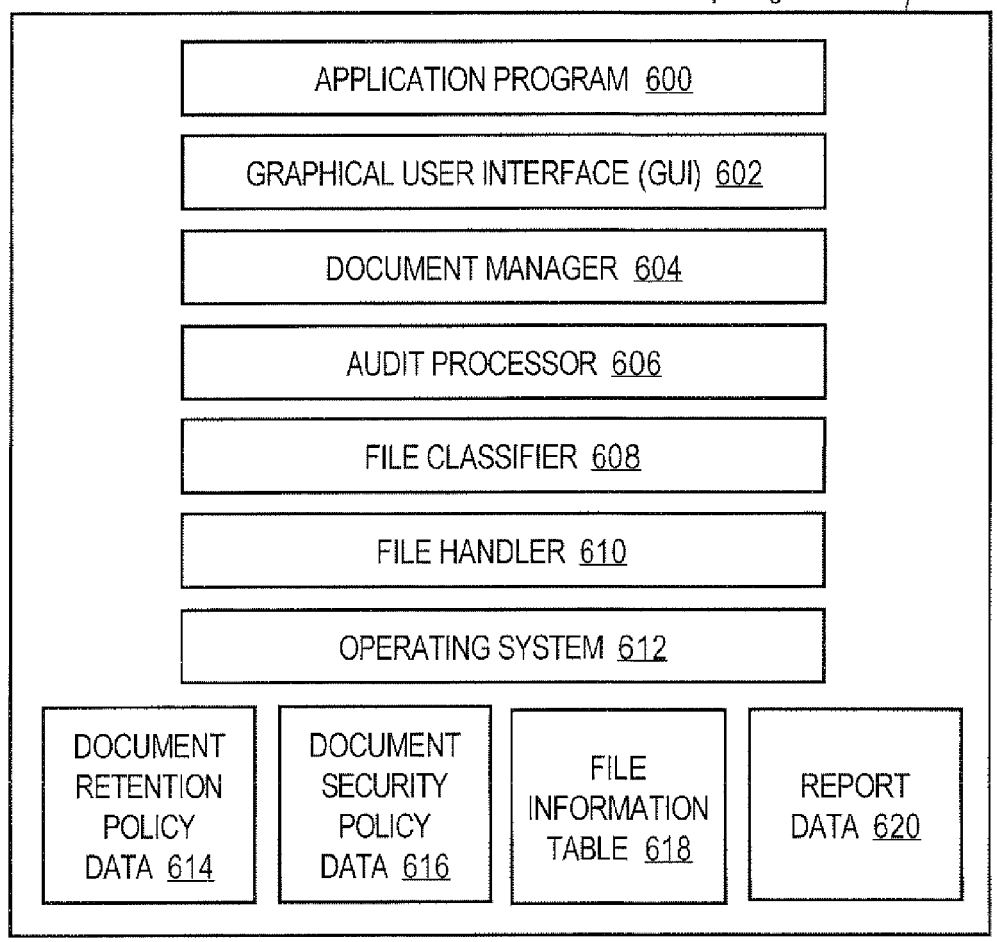
FIG. 6A is a block diagram that depicts example components and processes of network device.

FIG. 6A is a block diagram that depicts example components and processes of computing device 108 and/or network device 102. For purposes of explanation only, embodiments are described hereinafter with reference to computing device 108, but are also applicable to network device 102. Additional or fewer components and processes may be used, depending upon a particular implementation. In the example depicted in FIG. 6, network device 102 includes an application program 600, a graphical user interface (GUI) 602, a document manager 604, an audit processor 606, a file classifier 608, a file handler 610, an operating system (OS) 612, document retention policy data 614, document security policy data 616, a file information table 618 and report data 620. Application program 600 may be any type of application program that generates requests to access data. GUI 602 may be implemented by any mechanism that allows for the exchange of information between one or more users and computing device 108. Document manager 604 is configured to participate in the management of access to electronic documents using document retention policies and document security policies as described herein. Audit processor 606 is configured to participate in applying document retention policies to electronic documents as described herein.

Figure 6B:
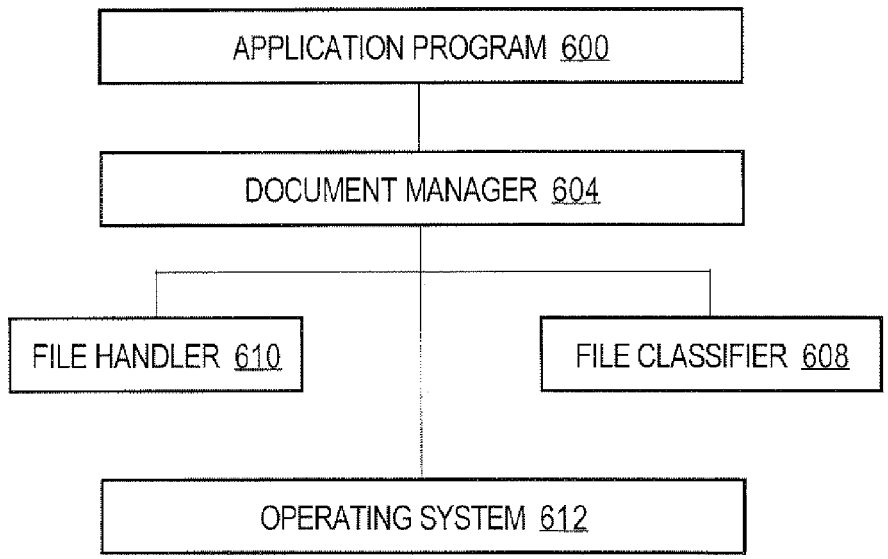
FIG. 6B is a block diagram that depicts logical relationships and interactions between various components of a computing device and/or a network device.

FIG. 6B is a block diagram that depicts logical relationships and interactions between various components of the computing device 108 and/or network device 102 of FIG. 6A. The user initiates application program 600 and generates data to be saved. When the user issues a save or save-as command, application program 600 invokes the local management system via document manager 602. Document manager 602, in turn, operates with file handler 610, file classifier 608 and operating system 612 to generate the executable data. The file classifier 608 applies access restrictions, e.g., read, write, and/or execute restrictions, to the generated executable data. File classifier 608 also manages classes for restrictions. For example, the Unix file system uses three classes (user, group, and world) with different access restrictions.

FIG. 7 depicts contents of an example file information table 618 that is used to manage access to electronic documents using document retention policies and document security policies, as described in more detail hereinafter. More specifically, file information table 618 is used to determine, for a particular electronic document, the corresponding document retention classification and document security classification. File information table 618 may also include other information, for example, a file name, a creation data and a location. The file name is the name of the file that contains the electronic document. The creation date is the creation date of the file that contains the electronic document. The creation date is useful for identifying particular electronic documents to be deleted on a document-by-document basis, for example if an document retention policy audit is conducted. For example, a particular document retention classification may have associated deletion criteria that specify deletion after one year from creation date of the document. In this situation, different electronic documents that have different creation dates, although all associated with the same particular document retention classification, are deleted at different times because of their different creation dates. The location indicates whether the file is stored locally on the particular element or on a removable storage media. For example, an "L" indicates that a particular electronic document is stored locally on network device 102, while an "R" indicates that the particular electronic document is stored on a removable medium or at another location. Additional data may be stored that indicates the particular location of an electronic document. For example, for a file having a location of "R", additional data may be maintained that identifies a particular removable medium where the file is stored. The additional data may specify, for example, a unique identifier of the removable medium. "O" indicates that the particular electronic document is stored in the other location accessible through the network.

According to one embodiment of the invention, document manager 604 manages the creation and maintenance of file information table 618. For example, document manager 604 may operate in conjunction with file handler 610 to create and populate file information table 618. For example, file handler 610 detects that a save or copy command has been issued to operating system 612 and in response, creates an entry in file information table 618 for the file that was saved or copied. File handler 610 may also detect that a file name has been changed and update the corresponding file name in file information table 618. File classifier 608 then interacts with a user through GUI 602 to obtain the classification for each file, or to copy the classification of the original file, in the case of a file copy.

VIII. Self Extracting and Executable Data Implementations

Figure 8:
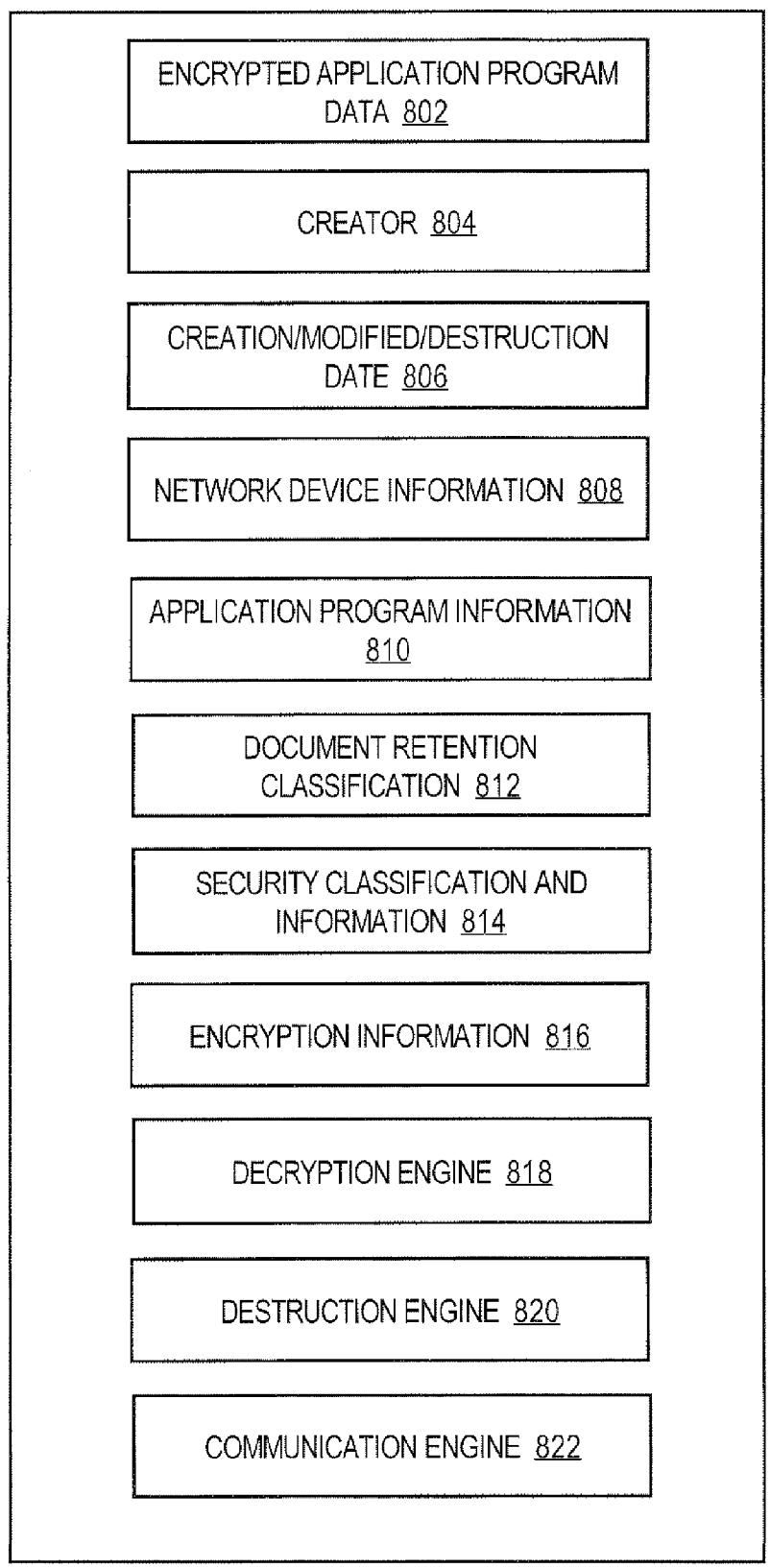
FIG. 8 is a block diagram that depicts example self-extracting and executable data for managing access to electronic documents using document retention policies and document security policies.

According to one embodiment of the invention, self-extracting and executable data file may be used to manage access to electronic documents using document retention policies and document security policies. FIG. 8 is a block diagram that depicts example self-extracting and executable data 800 (hereinafter "data 800") for managing access to electronic documents using document retention policies and document security policies, according to one embodiment of the invention. In general, data 800 includes encrypted application program data along with all information necessary to control access to the encrypted application program data using document retention policies and document security policies. For example, processing of data 800 may implement the steps depicted in FIG. 8. In the present example, data 800 includes encrypted application program data 802 that is data generated by an application program, such as application program 600, and encrypted by an encryption engine of file handler 610 that is depicted in more detail in FIG. 9 and described hereinafter. Creator 804 is data that identifies a creator of the application program data. For example, creator 804 may include data entered during a log in process. Creation/modified/destruction date 806 is based upon a document retention classification specified for the application data. Network device information 808 includes data that identifies a network device on which the application data was created. This may be used, for example, to determine an attempt to access data 800 is made on the same network device on which the application data was created. Application program information 810 includes data that identifies the application program used to create the application program data. This information may be used, for example, to execute the application program after the application program data is decrypted. Document retention classification 812 is the document retention classification selected for the application program data. Security classification and information 814 includes data that identifies the document security classification selected for the application program data. This information may be used, for example, to generate the graphical user interface when a user attempts to access the application program data. This information may be updated if changes are made to access policies for document security classifications, for example, on document security management system 120. Encryption information 816 is data that is used to encrypt and decrypt the application program data. Decryption engine 818 is used to decrypt the encrypted application program data 802 when the document retention policy and security policy are cleared. Therefore, even though the medium does not permit the deletion, data is secured through the encryption. The decrypted application program data is piped, i.e., provided, to an application program. Destruction engine 820 is a self destruct mechanism configured to cause the deletion of data 800 if the storage medium allows. Communication engine 822 provides access to document retention manger 110, document security management system 120 and personnel information system 110.

Figure 9:
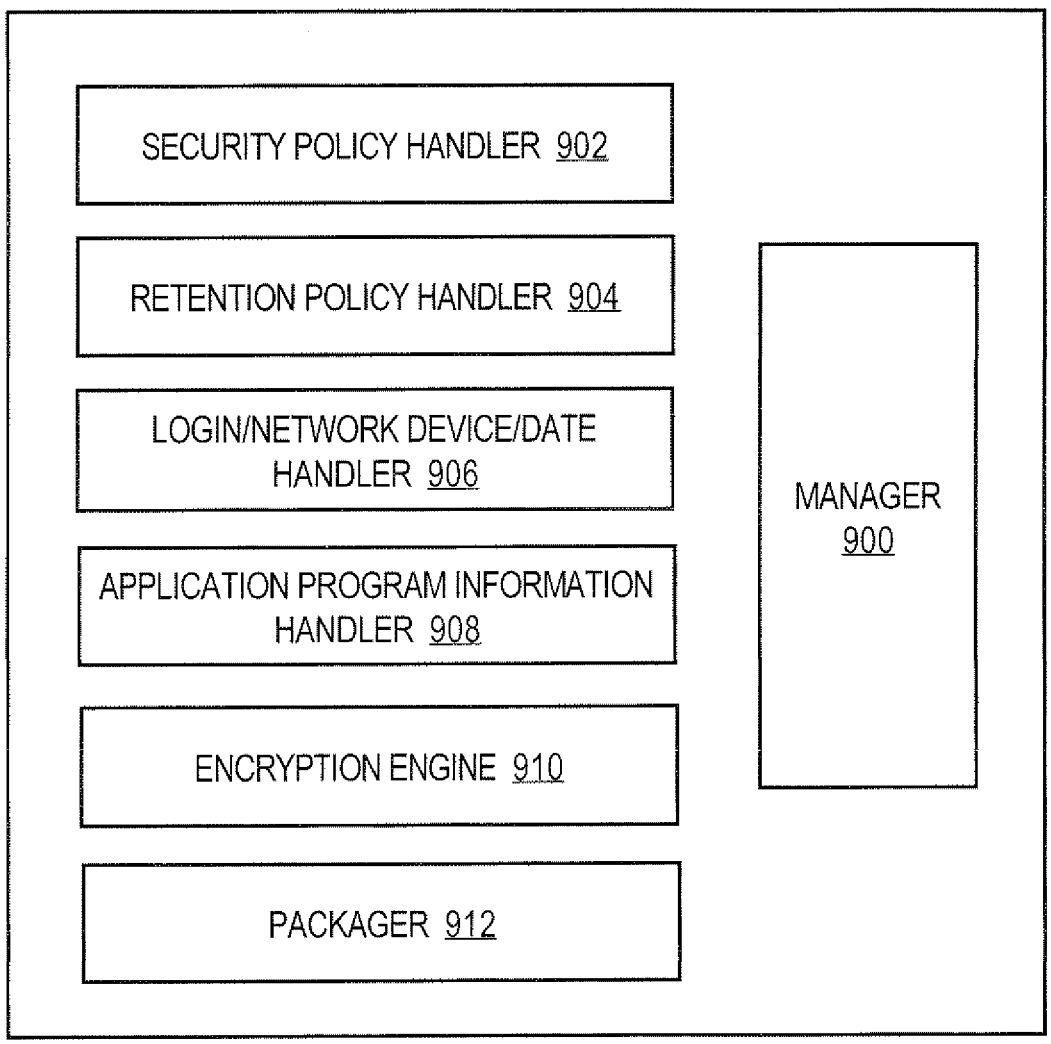
FIG. 9 is a block diagram that depicts an example implementation of a file handler.

FIG. 9 is a block diagram that depicts an example implementation of file handler 610, according to one embodiment of the invention. Other implementations may include fewer or additional elements, depending upon the requirements of a particular implementation. In this example, file handler 610 includes a manager 900 configured to manage the process of creating data 800. File handler 610 includes a security policy handler 902 that retrieves document security policy data from document security management system 120, along with other security-related information, such as procedures for enforcing a document security classification, login procedures, biometric information, etc., as well as other security information. Security policy handler 902 is also configured to retrieve local document security policy data 616 if there is a problem communicating with document security management system 120. For example, security policy handler 902 may implement the approach depicted in FIG. 9 for retrieving document security policy data. File handler 610 also includes a retention policy handler 904 that is configured to retrieve document retention policy data from document retention manger 110, or local document retention policy data 614, if there is a problem communicating with document retention manger 110. For example, retention policy handler 904 may implement the approach depicted in FIG. 9 for retrieving document retention policy data. A login/network device/date handler 906 obtains information about a user, the current network device and current date information. This information is used to generate the data 800. An application program information handler 908 interacts with application program 600 to obtain the necessary information to call the application program 600 when data 800 is accessed. An encryption engine 910 encrypts the application program data to be included in data 800. A packager 912 packages the various elements of data 800 to create data 800.

FIG. 10 is a flow diagram 1000 that depicts an example approach for file handler 610 to create data 800. In step 1002, the retention policy handler 904 is called to obtain the document retention classification. In step 1004, the security policy handler 902 is called to obtain the document security classification. In step 1006, the login/network device/date handler 906 is called to obtain the name of the creator, the network device on which the application program data was created and the current date. In step 1008, the encryption engine 910 is called to encrypt the application program data. In step 1010, the packager 912 is called to generate the data 800.

IX. Editing Document Retention Policies

Figure 11:
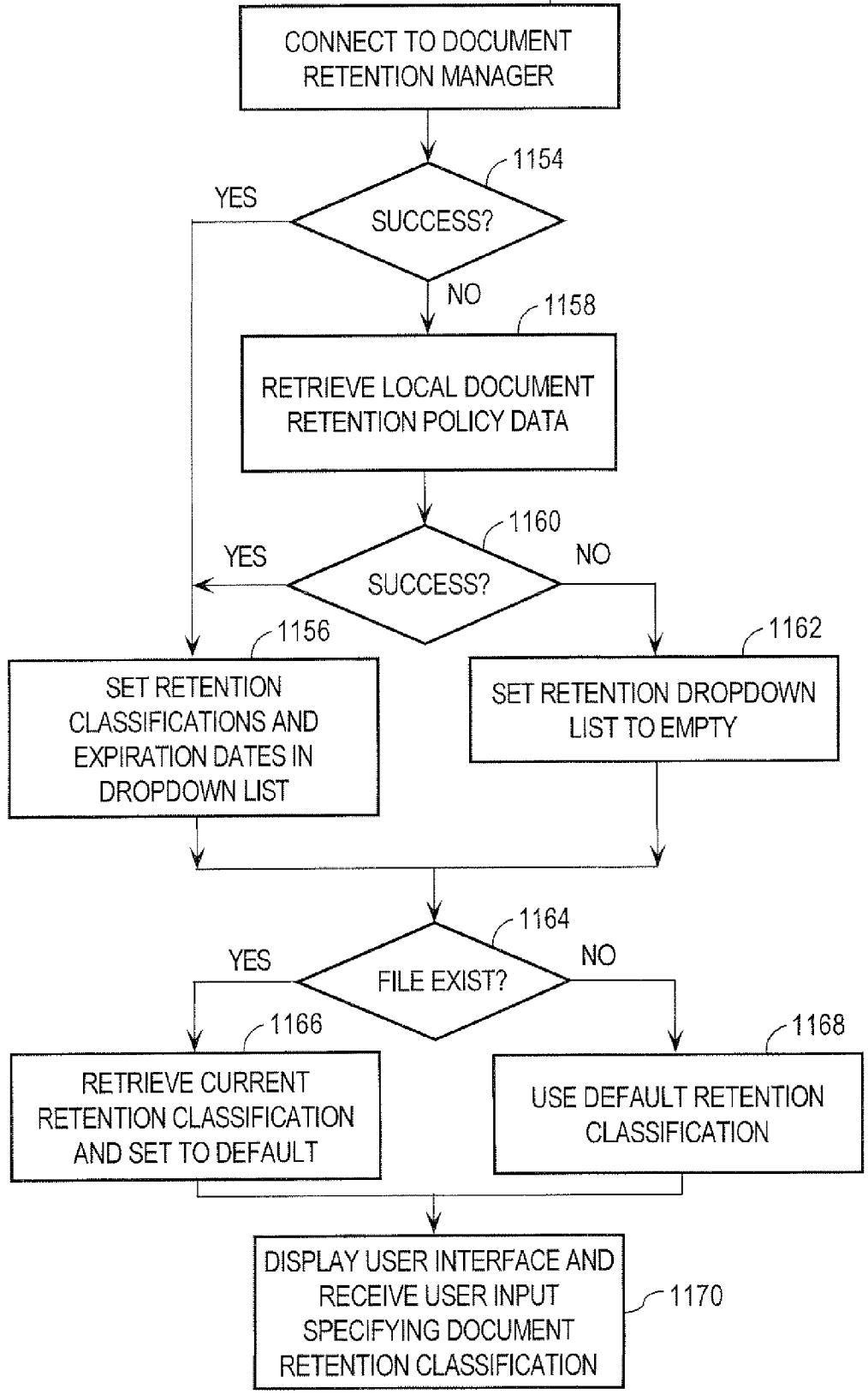
FIG. 11 is a flow diagram that depicts an example approach for editing document retention policy data.

FIG. 11 is a flow diagram 1150 that depicts an example approach for editing document retention policy data for a particular electronic document, according to one embodiment. In step 1152, retention policy editor 1102 attempts to connect to document retention manger 110 via network 114. If in step 1154 the connection attempt is successful, then in step 1156 the retention classifications and expiration dates in a dropdown list are established based upon the document retention policy data received from document retention manger 110. If, in step 1154 the connection attempt is not successful, then the retention policy editor 1102 retrieves local document retention policy data 1106 stored on the network device 102. If the retrieval of the local document retention policy data 1106 is successful, then control proceeds to step 1156 as previously described. If the local document retention policy data 1106 cannot be retrieved, then in step 1162, the retention classification dropdown list is set to empty. In step 1164 a determination is made whether the particular electronic document exists in the current document retention policy data. If so, then in step 1166 the current retention classification for the particular electronic document is retrieved and used as the default value. If not, then in step 1168, a default document retention classification is used. In step 1170, the user interface is displayed and user input is received specifying a document retention classification and/or deletion criteria.

X. Editing Document Security Policies

FIG. 12 is a flow diagram 1250 that depicts an example approach for editing document security policy data for a particular electronic document, according to one embodiment of the invention. In step 1252, security policy editor 1202 attempts to connect to document security management system 120 via network 114. If in step 1254 the connection attempt is successful, then in step 1256 a dropdown list is populated with security classifications in the document security policy data received from the document security management system 120. If, in step 1254 the connection attempt is not successful, then the security policy editor 1202 retrieves the local document security policy data 1206 stored on the network device 102. In step 1260, a selection of available security classifications and corresponding access policies are displayed on the GUI 1200. In step 1262 a determination is made whether the particular electronic document exists in the current document security policy data. If so, then in step 1264, the current security classification for the particular electronic document is retrieved and used as the default value. If not, then in step 1266, a default document retention classification is used. In step 1268, the user interface is displayed and user input is received specifying a document security classification.

FIG. 13 is a flow diagram 1300 that depicts an approach for managing access to electronic documents using document retention policies and document security policies. For purposes of explanation, this example is described in the context of managing access to a particular electronic document stored at network device 102, but the invention is not limited to this particular example or context.

In step 1302, a request to access a particular electronic document is detected. This may be performed by different entities, depending upon a particular implementation. For example, document manager 604 may become aware of the request to access the particular electronic document, for example, by intercepting a request made by application program 600, or by being notified by operating system 612 that the request has been made.

In step 1304, a document retention policy is identified and applied to the particular electronic document. This may include, for example, using data contained in file information table 618 to identify a particular document retention classification assigned to the particular electronic document. The document retention policy data 614 is then consulted to determine whether the deletion criteria for the particular document retention classification with respect to the particular electronic document is satisfied. For example, suppose that the data contained in file information table 618 indicate that the document retention classification assigned to the particular electronic document is C3. According to the table 200 depicted in FIG. 2, the deletion criteria for document retention classification C3 is one year. Thus, in the present example, a determination is made whether the particular electronic document has been in existence for more than one year. This may be determined, for example, by referring to the data contained in the file information table 618 that specifies details about electronic documents.

The document retention policy data 614 stored on network device 102 may be updated prior to applying the document retention policy, to ensure that the network device 102 has the most current version of document retention policy data 614. For example, document manager 604 may contact document retention manger 110 and request the latest version of document retention policy data. Document manager 604 receives and stores the document retention policy data 614 received from the document retention manger 110. If an error prevents document manager 604 from obtaining the current version of document retention policy data from, document retention manger 110, the document manager 604 may use the current version of document retention policy data 614 available on network device 102.

Document retention policy data 614 may be updated on a periodic basis or based upon other criteria. For example, when the document retention policy data is updated, the document retention manger 110 may notify network device 102 that an updated version of document retention policy data is available. Alternatively, the document retention manger 110 may automatically provide an updated version of document retention policy data to network device 102. As another alternative, FIG. 14 is a flow diagram 1400 that depicts document manager 604 obtaining deletion criteria from document retention manger 110. In step 1402, document manager 604 (or another process on network device 102) connects to document retention manger 110 via network 114. In step 1404, a determination is made whether the attempt to connect to document retention manger 110 was successful. The attempt might not be successful, for example, if an error occurs on network 114 or at document retention manger 110. If the attempt is successful, then in step 1406 the deletion criteria for a particular document retention classification is requested. For example, document manager 604 may use the data contained in file information table 618 to determine the document retention classification for the particular electronic document and then request the deletion criteria for the particular document retention classification from document retention manger 110.

In step 1408, the deletion criteria is received from the document retention manger 110. In step 1410, an expiration date is generated for the particular electronic document. For example, the expiration date may be generated by adding the retention length received from document retention manger 110 to the creation date for the particular electronic document. If, in step 1404, the attempt to contact the document retention manger 110 was not successful, then in step 1412, the retention length is retrieved from the local document retention policy data 614 stored on network device 102 and used to calculate the expiration date. As an alternative, a destruction date that is stored in association with the particular electronic document may be used as the expiration date. The use of destruction dates is described in more detail hereinafter.

In step 1414, the calculated expiration date is compared to the current date to determine whether the particular electronic document should be deleted. If, in step 1416, the current date is after the calculated expiration date, then in step 1418, a decision is made to not retain the particular electronic document. If, in step 1416, the current date is not after the calculated expiration date, then in step 1420, a decision is made to retain the particular electronic document. Although the prior example was described in the context of the deletion criteria being a retention length, the invention is not limited to this example context and any type of deletion criteria may be used. The prior example was described in the context of applying the document retention policy to the particular electronic document at network device 102. The document retention policy may also be applied to the particular electronic document at other locations. For example, instead of requesting deletion criteria, such as a retention length, from the document retention manger 110, the security classification and creation date for the particular electronic document may be supplied to the document retention manger 110 with a request for a decision on whether the particular electronic document should be deleted. In this situation, the document retention manger 110 determines whether the particular electronic document should be retained based upon the information provided in the request and the document retention policy data maintained by the document retention manger 110.

Returning to FIG. 13, if in step 1306, a determination has been made that, based upon application of the document retention policy to the particular electronic document, the particular electronic document should not be retained, then in step 1308, the particular electronic document is deleted. For example, document manager 604 may instruct operating system 612 to delete the particular electronic document.

If, in step 1306, a determination has been made that, based upon application of the document retention policy to the particular electronic document, the particular electronic document should be retained, then in step 1310, a document security policy is identified and applied to the particular electronic document. As with application of the document retention policy previously described, the application of the document security policy may be performed at network device 102 based upon the document security policy data 616 stored at network device 102. For example, document manager 604 may use document security policy data 616 to determine whether a user associated with the request to access the particular electronic document is authorized to access the particular electronic document. Alternatively, application of a document security policy may be performed based upon information received from document security management system 120 or may be performed entirely at document security management system 120. Application of a document security policy may also involve other entities.

For example, FIG. 15 is a flow diagram 1500 that depicts an approach for applying a document security policy to an electronic document according to one embodiment of the invention. In step 1502, document manager 604 (or another process on network device 102) connects to document security management system 120 via network 114. In step 1504, a determination is made whether the attempt to connect to document security management system 120 was successful. The attempt might not be successful, for example, if an error occurs on network 114 or at document security management system 120. If the attempt is successful, then in step 1506 the current document security policy data is requested, so that network device 102 will have the latest version. In step 1508, the current version of document security policy data is received by network device 102 from document security management system 120 and stored as document security policy data 616. The document security policy data is then used to determine the document security classification for the particular electronic document. The network device 102 may also receive from the document security management system 120 information contained in the file information table 618 for the particular electronic document, for example the security classification of the particular electronic document. If, in step 1504, the attempt to contact the document security management system 120 was not successful, then in step 1510, the local document security policy data 616 is used to determine the document security classification for the particular electronic document.

In step 1512, document manager 604 accesses personnel information system 110 to request an authorization check. For example, document manager 604 may provide to personnel information system 110 data that identifies a user associated with the request to access the particular electronic document and the security classification of the particular electronic document. The personnel information system 110 determines whether the user is authorized to access the particular electronic document, based upon the security classification of the particular electronic document and information about the user. For example, suppose that the document security classification for the particular electronic document is R4. In this situation, only individuals who are at the director level or above are authorized to access the particular electronic document. Personnel information system 110 checks attributes of the user and transmits a response to the network device 102 indicating whether the user is authorized to access the particular electronic document. In step 1514, the network device 102 receives the response from the personnel information system 110.

Returning to FIG. 13, if in step 1312, as a result of applying the document security policy to the particular electronic document, the user is not authorized to access the particular electronic document, then in step 1314, access to the particular electronic document is denied. For example, document manager 604 may instruct operating system 612 to deny access to the particular electronic document. According to one embodiment of the invention, denying access to a particular electronic document may be accomplished by causing the particular electronic document to be deleted. According to another embodiment of the invention, the particular actions take with respect to a particular electronic document are based upon the security classification of the particular electronic document. For example, electronic documents considered to be of high importance may be deleted while electronic documents of lower importance may be retained, but access to those electronic documents is denied to the application program that made the request. One example implementation is to cause deletion of electronic documents having a document security classification of R4 or higher, i.e., R4, R5 or S. Electronic documents having a security classification of R3, R2, R1 or U are retained, but the application program that made the request is denied access to the particular electronic document.

If, in step 1312, a determination is made that, based upon application of the document security policy to the particular electronic document, access should be allowed to the particular electronic document, then in step 1316 access to the electronic document is allowed. For example, application program 600 is allowed to access the particular electronic document.

FIG. 17 is a block diagram depicting example elements of content analyzer 122. Not all of the elements depicted in FIG. 17 are required to be implemented by content analyzer. Similarly, content analyzer 122 may include other elements not depicted in FIG. 17, depending upon a particular implementation. In this example, content analyzer 122 includes a semantic analysis engine 1710 that processes text-based information to extract the meaning of the text. The result may be combined with results generated by voice analysis engine 1770 and/or video analysis engine 1760 to add and/or enhance results, for example, to add emotional components. Text processing engine 1720 may use a variety of techniques to process and analyze text. For example, text processing engine 1720 may employ one or more of the techniques described in the book, "Taming Text: How to find, organize and manipulate it" by G. S. Ingersoll, et al copyrighted by Manning Publishing Co. Text processing engine 1720 may also classify text and may use data generated by semantic analysis engine 1710.

Duplicate check engine 1730 is configured to identify duplicate documents and/or duplicate portions of documents. This may occur, for example, when different users have the same document, or portions thereof. Duplicate check engine 1730 may use data generated by semantic analysis engine 1710 and text processing engine 1720 to identify duplicate data. Email chain analysis engine 1740 constructs a graph of from and to addresses along with the text being added by each person in the graph. This engine may use the results of the semantic analysis engine 1710 and the text processing engine 1720.

Policy check engine 1750 checks the semantics of documents to see if the correct policies are associated with the documents. If a mismatch is found, policy check engine 1750 notifies the mismatch to policy verifier 126 with the reference to the original document and the analysis results. Policy verifier 126 may provide a user interface that allows users to review documents and associate the correct classifications and/or policies to the documents to address the mismatch. Results of any conflict resolution may be provided to a learning process of a policy check engine 1750. Video information may be recognized by data preprocessor 112 and made available for further analyses by semantic analysis engine 1710 and text processing engine 1720.

Video analysis engine 1760 performs analysis of video, e.g., emotional components, along with visual recognition of objects in the video that are combined with the results of semantic analysis engine 1710 and text processing engine 1720. Data preprocessor 112 may recognize voice information for further analyses by semantic analysis engine 1710 and text processing engine 1720. Voice analysis engine 1770 performs analysis of voice components and provides recognition of speakers that are combined with the results of semantic analysis engine 1710 and text processing engine 1720. Data preprocessor 112 may also recognize image data, for example, via OCR for the further analyses by semantic analysis engine 1710 and text processing engine 1720. Image analysis engine 1780 may be configured to recognize various features in image data, for example, by performing face recognition and scene recognition to identify people, locations and situations. Image analysis engine 1780 may use results from semantic analysis engine 1710 and text processing engine 1720 and results of the image analysis engine 1780 may be combined with the results of semantic analysis engine 1710 and text processing engine 1720.

FIG. 18 is a table 1800 that depicts example results of processing performed by data preprocessor 112. The content analyzer 122 may use data in this format and append results of analyzing the content of the data. In this example, the data depicted in table 1800 includes a data type 1810, a data suffix 1820 (to preserve the original suffix), standard format data 1830 and supplemental data 1840, such as results of OCR, voice recognition, etc., in the standard format. Engine 112 uses data in this format and appends the results of analysis.

XI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 19:
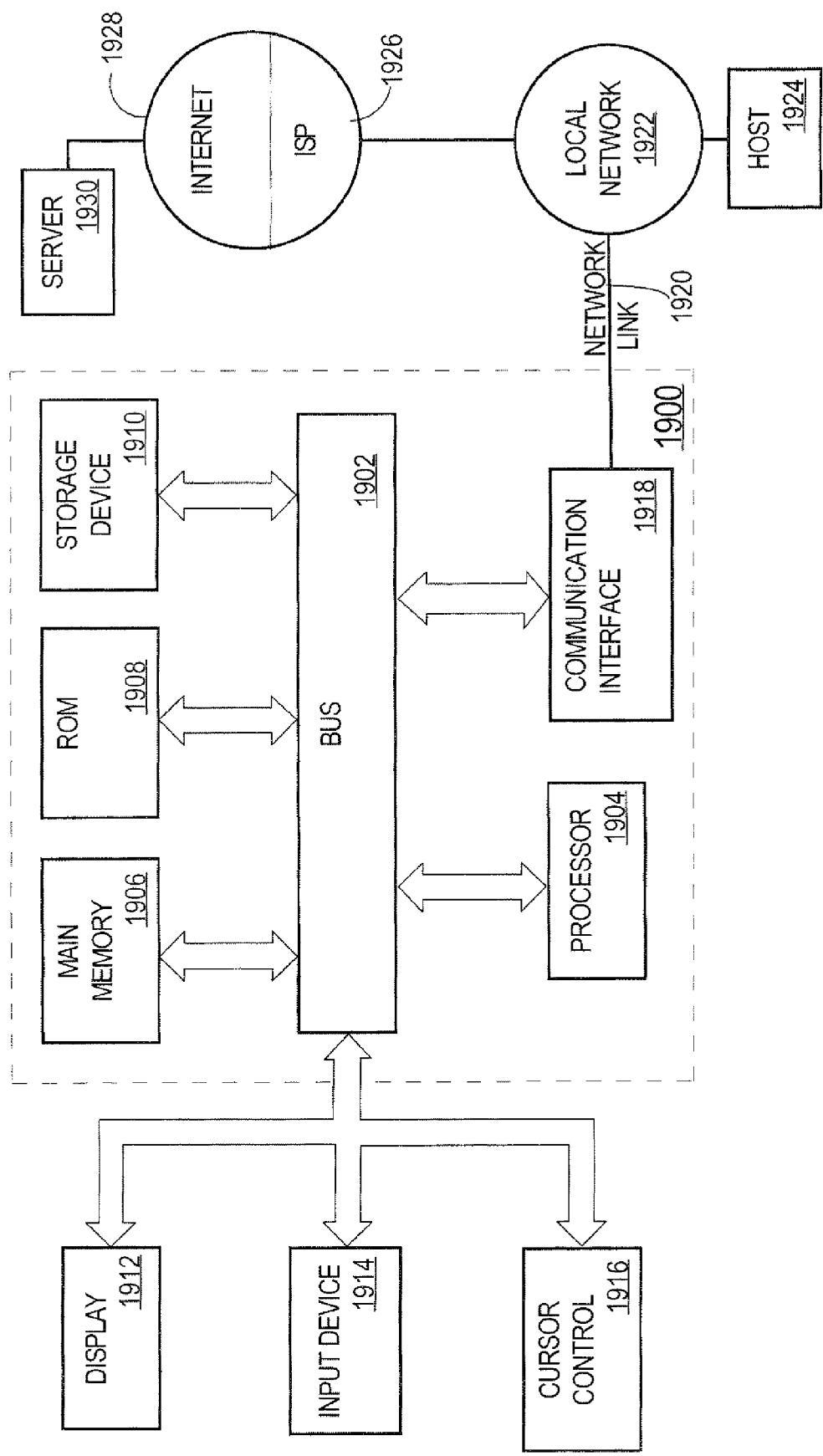
FIG. 19 is a block diagram of a computer system on which embodiments may be implemented.

FIG. 19 is a block diagram that depicts an example computer system 1900 upon which embodiments may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. Although bus 1902 is illustrated as a single bus, bus 1902 may comprise one or more buses. For example, bus 1902 may include without limitation a control bus by which processor 1904 controls other devices within computer system 1900, an address bus by which processor 1904 specifies memory locations of instructions for execution, or any other type of bus for transferring data or signals between components of computer system 1900.

An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic or computer software which, in combination with the computer system, causes or programs computer system 1900 to be a special-purpose machine. According to one embodiment, those techniques are performed by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1900, various computer-readable media are involved, for example, in providing instructions to processor 1904 for execution. Such a medium may take many forms, including but not limited to, non-volatile media and volatile media. Non-volatile media includes, for example, optical or magnetic disks, such as storage device 1910. Volatile media includes dynamic memory, such as main memory 1906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. The received code may be executed by processor 1904 as it is received, and/or stored in storage device 1910, or other nonvolatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for managing access to electronic documents, the apparatus comprising:
   one or more processors; and
   one or more memories communicatively coupled to the one or more processors and storing instructions which, when processed by the one or more processors, cause:
   receiving, at the apparatus, a plurality of electronic documents;
   analyzing content of one or more electronic documents from the plurality of electronic documents and generating content data that indicates results of analyzing the content of the one or more electronic documents;

automatically determining, based upon the content data that indicates results of analyzing the content of the one or more electronic documents, a document classification for each electronic document from the one or more electronic documents;

retrieving, for the one or more electronic documents, document classification data that indicates a user-specified document classification for each electronic document from the one or more electronic documents;

determining whether a document classification automatically determined for a particular electronic document from the one or more electronic documents is the same as a particular user-specified document classification for the particular electronic document indicated by the document classification data;

in response to determining that the document classification automatically determined for the particular electronic document from the one or more electronic documents is not the same as the particular user-specified document classification for the particular electronic document indicated by the document classification data, then generating a graphical user interface that allows a user to specify a correct document classification for the particular electronic document from the one or more electronic documents; and in response to determining that the document classification automatically determined for the particular electronic document from the one or more electronic documents is the same as the particular user-specified document classification for the particular electronic document indicated by the document classification data, then:

determining, based upon the document classification automatically determined for the particular electronic document from the one or more electronic documents and one or more policies that correspond to the document classification, whether the particular electronic document should be deleted, and in response to determining, based upon the document classification automatically determined for the particular electronic document from the one or more electronic documents and one or more policies that correspond to the document classification, that the particular electronic document should be deleted, then causing the particular electronic document to be deleted.

2. The apparatus as recited in claim 1, wherein:

the user-specified document classification and the document classification automatically determined for the particular electronic document include one or more retention classifications, the one or more policies that correspond to the document classification specify one or more document retention policies that specify one or more deletion criteria, determining, based upon the document classification automatically determined for the particular electronic document from the one or more electronic documents and one or more policies that correspond to the document classification, whether the particular electronic document should be deleted includes determining whether the one or more deletion criteria specified by the one or more document retention policies are satisfied with respect to the particular electronic document.

3. The apparatus as recited in claim 1, wherein automatically determining, based upon the content data that indicates the content of the one or more electronic documents, a document classification for each electronic document from the one or more electronic documents is performed using one or more of semantic analysis, text analysis, video analysis, voice analysis or image analysis.

4. The apparatus as recited in claim 1, wherein the one or more memories store additional instructions which, when processed by the one or more processors cause:

processing a natural language query against the plurality of electronic documents and determining that the particular electronic document satisfies the natural language query, and if the particular electronic document has not been deleted, providing the particular electronic document.

5. The apparatus as recited in claim 1, wherein the one or more memories store additional instructions which, when processed by the one or more processors cause:

receiving a request to access the particular electronic document, in response to receiving the request to access the particular electronic document:

determining one or more security classifications that apply to the particular electronic document, determining, based upon the one or more security classifications that apply to the particular electronic document one or more security policies that apply to the particular electronic document, and determining, based upon the one or more security policies that apply to the particular electronic document, whether access to the particular electronic document is to be granted in response to the request to access the particular electronic document.

6. One or more non-transitory computer-readable media for managing access to electronic documents, the one or more non-transitory computer-readable media storing instructions which, when processed by one or more processors, cause:

receiving, at the apparatus, a plurality of electronic documents;

analyzing content of one or more electronic documents from the plurality of electronic documents and generating content data that indicates results of analyzing the content of the one or more electronic documents;

automatically determining, based upon the content data that indicates results of analyzing the content of the one or more electronic documents, a document classification for each electronic document from the one or more electronic documents;

retrieving, for the one or more electronic documents, document classification data that indicates a user-specified document classification for each electronic document from the one or more electronic documents;

determining whether a document classification automatically determined for a particular electronic document from the one or more electronic documents is the same as a particular user-specified document classification for the particular electronic document indicated by the document classification data;

in response to determining that the document classification automatically determined for the particular electronic document from the one or more electronic documents is not the same as the particular user-specified document classification for the particular electronic document indicated by the document classification data, then generating a graphical user interface that allows a user to specify a correct document classification for the particular electronic document from the one or more electronic documents; and in response to determining that the document classification automatically determined for the particular electronic document from the one or more electronic documents is the same as the particular user-specified document classification for the particular electronic document indicated by the document classification data, then:

determining, based upon the document classification automatically determined for the particular electronic document from the one or more electronic documents and one or more policies that correspond to the document classification, whether the particular electronic document should be deleted, and in response to determining, based upon the document classification automatically determined for the particular electronic document from the one or more electronic documents and one or more policies that correspond to the document classification, that the particular electronic document should be deleted, then causing the particular electronic document to be deleted.

7. The one or more non-transitory computer-readable media as recited in claim 6, wherein:

the user-specified document classification and the document classification automatically determined for the particular electronic document include one or more retention classifications, the one or more policies that correspond to the document classification specify one or more document retention policies that specify one or more deletion criteria, determining, based upon the document classification automatically determined for the particular electronic document from the one or more electronic documents and one or more policies that correspond to the document classification, whether the particular electronic document should be deleted includes determining whether the one or more deletion criteria specified by the one or more document retention policies are satisfied with respect to the particular electronic document.

8. The one or more non-transitory computer-readable media as recited in claim 6, wherein automatically determining, based upon the content data that indicates the content of the one or more electronic documents, a document classification for each electronic document from the one or more electronic documents is performed using one or more of semantic analysis, text analysis, video analysis, voice analysis or image analysis.

9. The one or more non-transitory computer-readable media as recited in claim 6, further comprising additional instructions which, when processed by the one or more processors cause:

processing a natural language query against the plurality of electronic documents and determining that the particular electronic document satisfies the natural language query, and if the particular electronic document has not been deleted, providing the particular electronic document.

10. The one or more non-transitory computer-readable media as recited in claim 6, further comprising additional instructions which, when processed by the one or more processors cause:

receiving a request to access the particular electronic document, in response to receiving the request to access the particular electronic document:

determining one or more security classifications that apply to the particular electronic document, determining, based upon the one or more security classifications that apply to the particular electronic document one or more security policies that apply to the particular electronic document, and determining, based upon the one or more security policies that apply to the particular electronic document, whether access to the particular electronic document is to be granted in response to the request to access the particular electronic document.

11. A computer-implemented method comprising:

receiving, at the apparatus, a plurality of electronic documents;

analyzing content of one or more electronic documents from the plurality of electronic documents and generating content data that indicates results of analyzing the content of the one or more electronic documents;

automatically determining, based upon the content data that indicates results of analyzing the content of the one or more electronic documents, a document classification for each electronic document from the one or more electronic documents;

retrieving, for the one or more electronic documents, document classification data that indicates a user-specified document classification for each electronic document from the one or more electronic documents;

determining whether a document classification automatically determined for a particular electronic document from the one or more electronic documents is the same as a particular user-specified document classification for the particular electronic document indicated by the document classification data;

in response to determining that the document classification automatically determined for the particular electronic document from the one or more electronic documents is not the same as the particular user-specified document classification for the particular electronic document indicated by the document classification data, then generating a graphical user interface that allows a user to specify a correct document classification for the particular electronic document from the one or more electronic documents; and in response to determining that the document classification automatically determined for the particular electronic document from the one or more electronic documents is the same as the particular user-specified document classification for the particular electronic document indicated by the document classification data, then:

determining, based upon the document classification automatically determined for the particular electronic document from the one or more electronic documents and one or more policies that correspond to the document classification, whether the particular electronic document should be deleted, and in response to determining, based upon the document classification automatically determined for the particular electronic document from the one or more electronic documents and one or more policies that correspond to the document classification, that the particular electronic document should be deleted, then causing the particular electronic document to be deleted.

12. The computer-implemented method as recited in claim 11, wherein:

the user-specified document classification and the document classification automatically determined for the particular electronic document include one or more retention classifications, the one or more policies that correspond to the document classification specify one or more document retention policies that specify one or more deletion criteria, determining, based upon the document classification automatically determined for the particular electronic document from the one or more electronic documents and one or more policies that correspond to the document classification, whether the particular electronic document should be deleted includes determining whether the one or more deletion criteria specified by the one or more document retention policies are satisfied with respect to the particular electronic document.

13. The computer-implemented method as recited in claim 11, wherein automatically determining, based upon the content data that indicates the content of the one or more electronic documents, a document classification for each electronic document from the one or more electronic documents is performed using one or more of semantic analysis, text analysis, video analysis, voice analysis or image analysis.

14. The computer-implemented method as recited in claim 11, further comprising:
processing a natural language query against the plurality of electronic documents and determining that the particular electronic document satisfies the natural language query, and
if the particular electronic document has not been deleted, providing the particular electronic document.

15. The computer-implemented method as recited in claim 11, further comprising:
receiving a request to access the particular electronic document,
in response to receiving the request to access the particular electronic document:
determining one or more security classifications that apply to the particular electronic document,
determining, based upon the one or more security classifications that apply to the particular electronic document one or more security policies that apply to the particular electronic document, and
determining, based upon the one or more security policies that apply to the particular electronic document, whether access to the particular electronic document is to be granted in response to the request to access the particular electronic document.

* * * * *